United States Patent
Wilcher et al.

(10) Patent No.: US 6,942,789 B2
(45) Date of Patent: Sep. 13, 2005

(54) FILTER SCREEN ASSEMBLY

(75) Inventors: Stephen B. Wilcher, Harleysville, PA (US); Juan Fernando Segura, Lansdale, PA (US); Nathan Lawrence Panek, Sringfield, PA (US); Alan Wallace Steele, Glenside, PA (US)

(73) Assignee: USFilter Corporation, Warrendale, PA (US)

( * ) Notice: Subject to any disclaimer, the term of this patent is extended or adjusted under 35 U.S.C. 154(b) by 96 days.

(21) Appl. No.: 10/364,747

(22) Filed: Feb. 10, 2003

(65) Prior Publication Data

US 2003/0155286 A1 Aug. 21, 2003

Related U.S. Application Data

(60) Provisional application No. 60/355,003, filed on Feb. 8, 2002.

(51) Int. Cl.$^7$ ................................................ B01D 33/04
(52) U.S. Cl. ........................ 210/158; 210/160; 210/400
(58) Field of Search ................................ 210/155, 158, 210/160, 400

(56) References Cited

U.S. PATENT DOCUMENTS

| | | | | |
|---|---|---|---|---|
| 819,720 A | * | 5/1906 | Brunotte | .................. 210/158 |
| 1,967,050 A | * | 7/1934 | Brackett | .................. 210/160 |
| 2,286,332 A | | 6/1942 | Bleyer | |
| 3,225,928 A | * | 12/1965 | Black | .................. 210/160 |
| 3,757,949 A | | 9/1973 | Halvorsen et al. | |
| 3,802,565 A | | 4/1974 | Hughes et al. | |
| 4,359,385 A | | 11/1982 | Krivec | |
| 4,360,426 A | | 11/1982 | Wetzel | |
| 4,597,864 A | | 7/1986 | Wiesemann | |
| 4,774,010 A | | 9/1988 | Bratten | |
| 5,102,536 A | * | 4/1992 | Wiesemann | .................. 210/400 |
| 5,415,766 A | | 5/1995 | Quick et al. | |
| 5,489,378 A | * | 2/1996 | Cheesman et al. | .................. 210/160 |
| 5,618,415 A | | 4/1997 | Johnson, Jr. | |
| 5,798,039 A | | 8/1998 | Wiesemann | |
| 5,800,701 A | | 9/1998 | Larsen | |
| 5,993,651 A | | 11/1999 | Wiesemann | |
| 6,019,892 A | | 2/2000 | Wilcher | |
| 6,251,268 B1 | | 6/2001 | Holmberg | |
| 6,280,612 B1 | | 8/2001 | Kroos | |
| 6,294,085 B1 | | 9/2001 | Bache | |

* cited by examiner

*Primary Examiner*—Christopher Upton
(74) *Attorney, Agent, or Firm*—Michael Best & Friedrich LLP (57) ABSTRACT

A waste water filter screen assembly that has a substantially open foot section to promote more efficient flow through. The rotating grid is generally free hanging. The present invention further provides a drive assembly with square, high friction drive drums mounted on the drive shaft. The present invention further provides idler roller assemblies mounted for guiding the rotating grid adjacent the filter screen assembly head. The open foot section, drive assembly and idler roller assembly are useable with filter grids of both the link element type and the panel type.

9 Claims, 11 Drawing Sheets

FILTER SCREEN ASSEMBLY

This application claims the benefit of Provisional application Ser. No. 60/355,003, filed Feb. 8, 2002.

BACKGROUND

Difficulties are encountered in practice in the treatment of contaminated water flows such as sewage prior to fine filtration, due to the presence of heavy and generally untreatable objects such as rags, string, plastic bags, and the like. Wastewater treatment plants typically utilize some type of screening equipment to remove harmful debris contained in the waste stream flow. Screening equipment is often utilized in the headworks section of the plant, and is the first area to come in contact with the waste stream. The screens are typically made from corrosion resistant materials such as 304 or 316 stainless steel, plastics or other synthetic materials. In order to protect the downstream equipment and processes, screening equipment is designed and incorporated in a plant to remove a large majority of debris before it comes into contact with any downstream equipment. If such items are not removed, proper and adequate treatment of the liquid does not result, and blockage of ducts and channels may occur.

There are many different screening equipment designs. A screening device is known comprising a continuously movable endless conveyor loop formed of a series of interconnected link pieces each having a lifting hook on which material to be screened is collected during movement through the contaminated water flow. Fine screens of this nature are typically defined by the size of the screen openings, which can be from as small as a quarter inch to one-half inch. These units can also be sized to have clear openings as large as 2 inches or more, but typically are not. The screen openings are designed to address both the horizontal and vertical limiting dimensions. The horizontal dimension is the small dimension and definition of the continuous belt, for example, one-quarter inch. The vertical dimension is typically significantly larger (approx. 4 in. or 6 in.) and is tied to the length of individual elements and the interconnected driving links and support shafts or pivot rods.

Another type of screening device is a panel type filter screen assembly. The panel type filter screen units generally include a plurality of filter panels and an endless chain operationally connected to the filter panels to move the filter panels through the water or wastewater while following a guided path in the structural frame of the filter screen. Typical panel type filter screen units utilize a plurality of filter panels that are fabricated of metal such as steel or stainless steel or other non-corrosive material. Such a panel typically consists of a large number of metal bars 2 spaced from and generally parallel to one another and welded vertically to a metal panel frame 4. The filter panel assemblies are operationally attached to the drive system, such as to an endless chain, and movement of the chain in turn moves the filter panel assemblies along a guided path within the structural frame of the screen filter apparatus 10.

Figure 1:
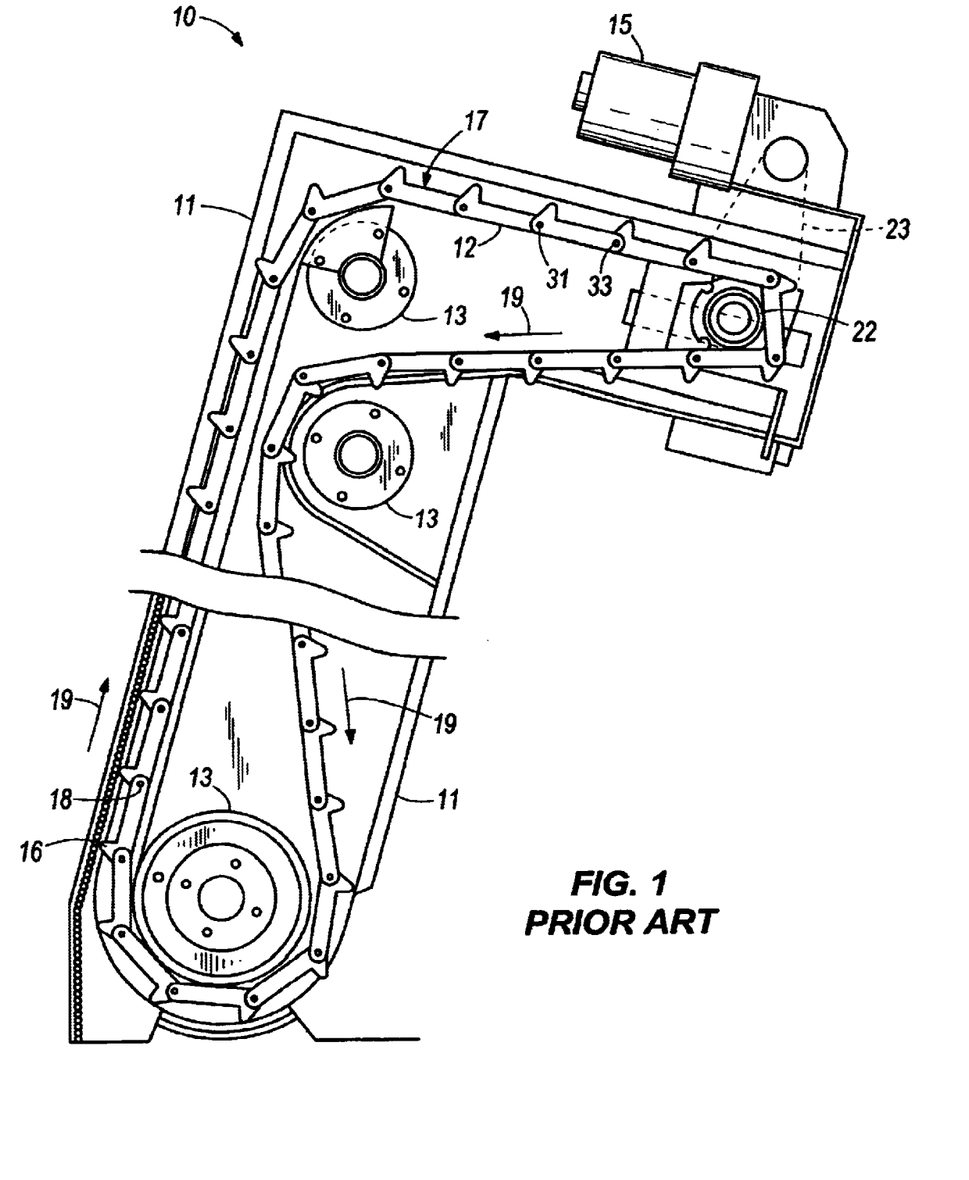
FIG. 1 is a side elevational view of a prior art waste material filter assembly.
Figure 2:
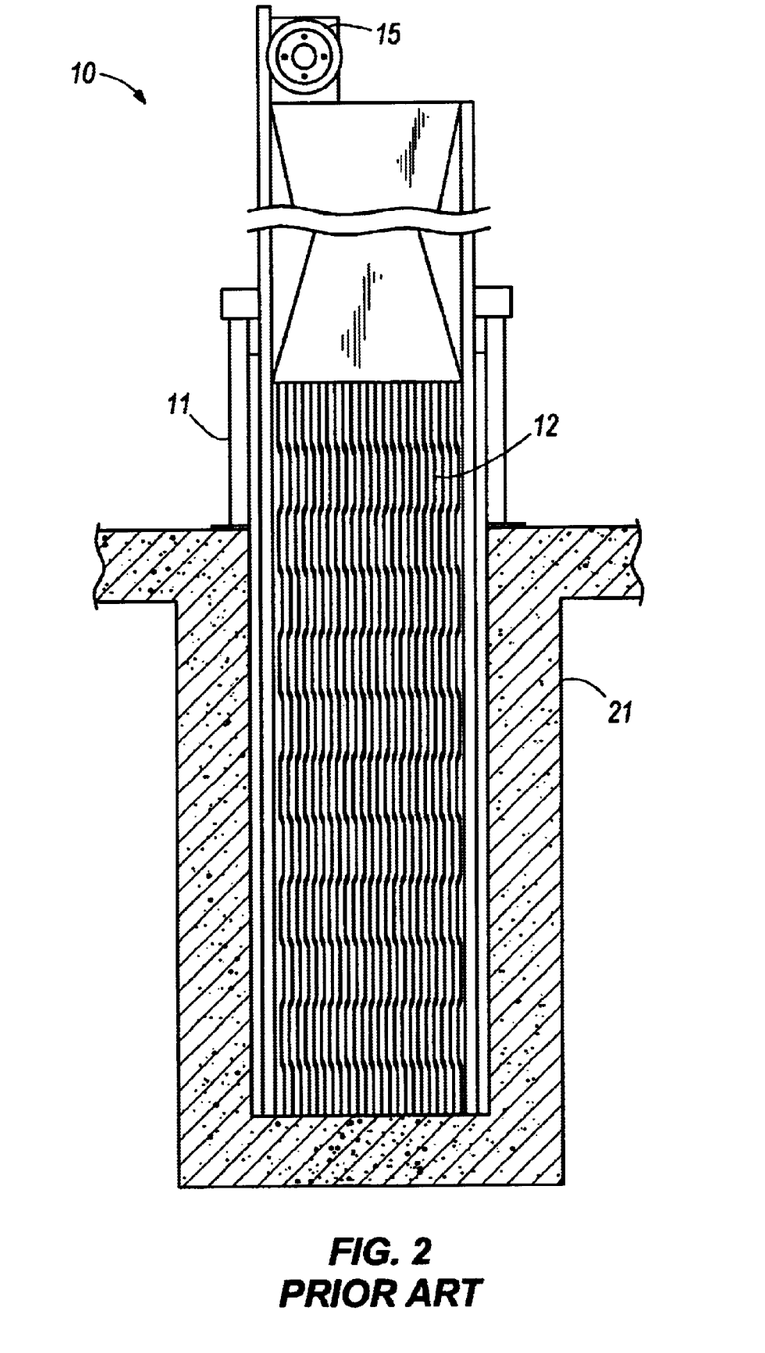
FIG. 2 is a front elevational view of the filter assembly of FIG. 1 disposed in a channel for carrying waste water.
Figure 3:
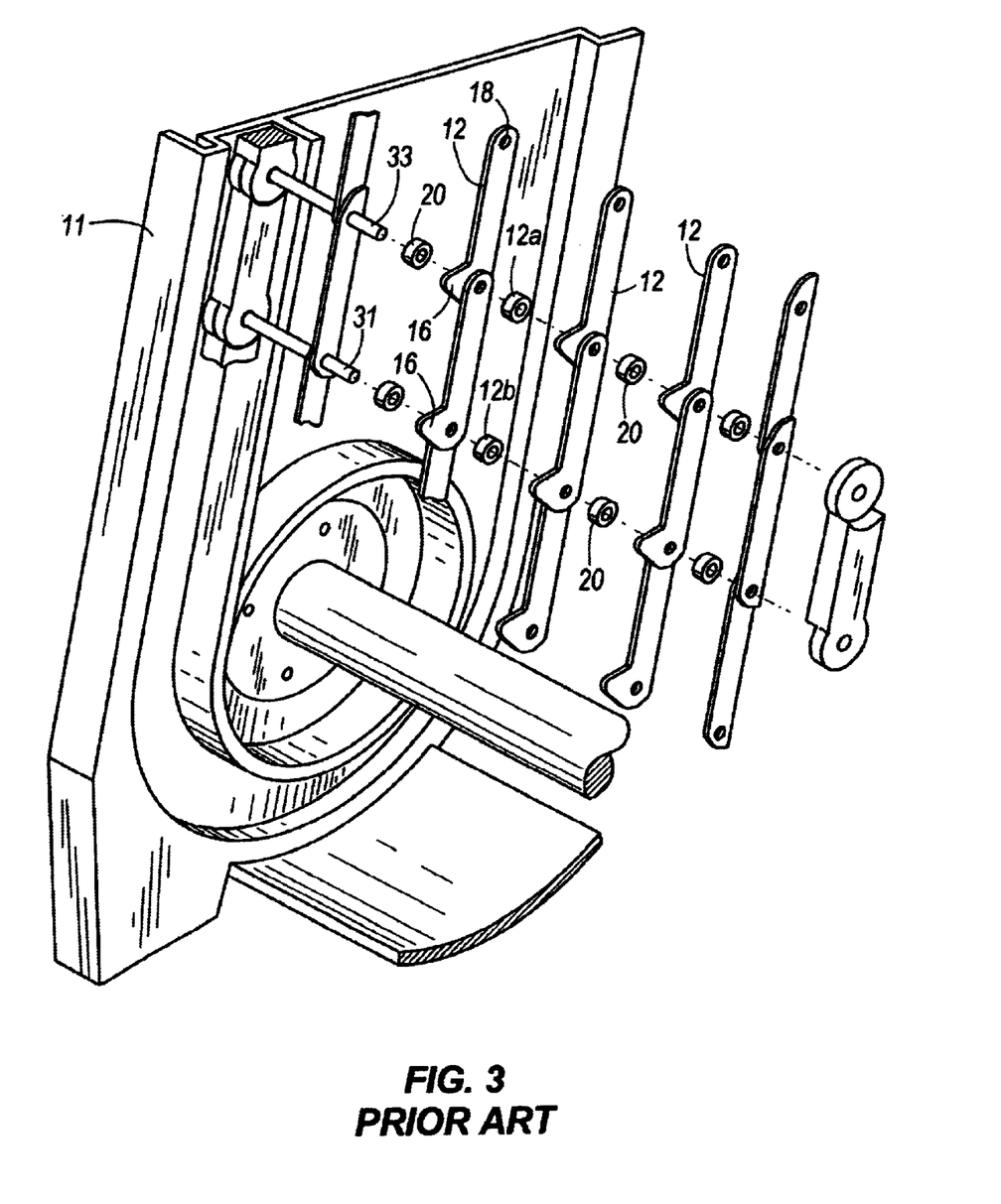
FIG. 3 is an exploded perspective view showing the assembly of the prior art filter assembly.

An illustrative screen filter apparatus 10 is shown in FIGS. 1–3. Referring first to FIG. 1, it will there be seen that a waste material filtering apparatus 10 of the prior art generally includes a frame 11, a plurality of pipe spreaders 13, a drive motor 15 connected to a drive sprocket assembly 22 by a drive belt or chain 23, shown in phantom lines, and a rotating screen assembly 17 driven by the sprocket assembly. Referring to FIG. 2, the apparatus 10 sits in a channel 21 within which flows a stream of water containing solid waste.

The rotating grid assembly 17 is a link type grid that includes a plurality of vertically disposed, laterally spaced apart link members 12 that are disposed in articulated relation to one another. The trailing end of each link 12 has an integral horizontally-extending part 16 that helps hold and lift solid matter from the stream as the screen segments travel upwardly on the upstream side of the machine. Means are provided at the discharge end of the apparatus for dumping the matter so lifted into a solid waste collection container.

The opposite ends of each link 12 is mounted on a shaft 31, 33. The trailing end of each link 12 is the aforementioned horizontally-extending member 16 that helps hold and lift solid matter from the water stream as the links rotate, as is perhaps best understood by observing the links at the lower left corner of FIG. 1. The uppermost or leading end of each link is denoted 18. Plural directional arrows, collectively denoted 19, show the path of travel followed by the links as the machine operates. The orientation of machine 10 in a channel of water is shown in FIG. 2. The concrete channel is denoted 21. In this particular example, there are about twenty five upstanding screen segments disposed in equidistantly spaced lateral relation to one another, each screen segment being formed by a group of articulated link members 12.

The conventional assembly pattern of links is best understood in connection with FIG. 3. The links 12 of the prior art rotating screen are typically assembled in the following pattern. The trailing and leading ends 16, 18, respectively, of a link 12a are slipped onto a pair of contiguous shafts 31, 33, with the same procedure repeated about the remaining alternating shafts 31, 33 of the screen assembly 17. The trailing end of the next link 12b is then slid onto shaft 31 and the leading end of that link is slid onto shaft 33. The alternating pattern is then followed as links are placed on all of the shafts 31, 33. Spacers 20 are then added to each shaft, and the same pattern of assembly is repeated to construct a screen assembly 17 of a desired width. The alternating nature of the links 12a, 12b connects the links into a continuous loop.

The rotating grid assembly 17 is generally a large structure that is directly driven by the sprocket drive assembly 22 and is under significant tension. The sprocket assembly 22 generally includes a plurality of laterally spaced apart motor-driven sprocket segments. The sprocket segments are positioned in offset relation to the individual links 12 so that as the links 12 pass there over, the sprocket segments enter into the spaces between the links 12. Such a sprocket drive assembly 22 is subject to jamming because the apparatus performs well only when the sprocket segments are perfectly or almost perfectly aligned with respect to each contiguous set of links. In order to establish such perfect alignment, the spacers between the sprockets must be manufactured to very tight tolerances. However, a single drive shaft may include from 10 to 150 or more spacers. Any inaccuracy in the individual spacer tolerances is accumulated across the shaft to create a total inaccuracy that is often unacceptable. Even when the sprocket segments and links 12 are in their respective ideal relative positions, the sprocket segments rub against their contiguous links 12 in alternating succession, displacing each link about one-sixteenth of an inch per rub. More particularly, the links are displaced in a first direction in a first rub, and are displaced in an opposite direction during a second rub. Due to the rubbing and alternating displacement of the links, the sprocket segments and links 12 eventually become misaligned and collide with one another. This bends the links 12, damages the sprocket segments, and prevents further rotation of the rotating screens until the apparatus has been disassembled and new links 12 and sprocket segments installed. The repair procedure typically requires the grid assembly to be dismantled to expose the drive shaft and sprockets for repair or the entire assembly must be removed and returned to a shop for repair.

To define the path of the screen assembly 17, the prior art system includes sliding wear bars 40 to define the path of the screen loop adjacent the top of the filter assembly 10 and inner and outer guide rails 42, 44 and a bottom guide 46 are provided adjacent the bottom of the assembly 10 to track the screen assembly 17. The wear bars 40 are subject to significant wear from the continuous travel of the links 12 there over. The internal positioning of the wear bars 40 make them difficult to maintain and replace. Additionally, the wear bars 40 cause wear and additional frictional load on the screen assembly 17. The guide rails 42, 44 and bottom guide 46 are also subject to wear. Additionally, since these components 42–46 are in the fluid stream, they act as a point of debris build-up. The built up debris negatively effects flow throughput. Additionally, grit, sand and the like trapped between the guides 42, 44 and 46 and the screen assembly 17 acts to accelerate wear on the screen assembly 17. The limited accessibility makes component replacement and debris flushing difficult.

SUMMARY

The present invention provides a waste water filter assembly that has a substantially open foot section to promote efficient flow through. The filter screen is generally free hanging with spaced apart guide rails and a wear bar defining the filter path extents, but not confining the filter screen grid. The present invention further provides a drive assembly with square, high friction drive drums mounted on a drive shaft. Each side of the drum is provided with a high friction material, for example, high friction brake pad lining. The present invention further provides idler roller assemblies mounted for guiding the filter screen adjacent the filter assembly head. Each roller preferably includes replaceable split roller wheels with non-lubricated bushings that align with and contact respective guide link sections on the screen loop. Each roller is preferably free-wheeling and independent of the other roller wheels of the assembly. The rollers are preferably sized slightly larger toward the outer edges of the screen to maintain proper tracking of the screen loop. The open foot assembly, drive assembly and idler roller assembly are useable with filter grids of both the link element type and the panel type.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 4:
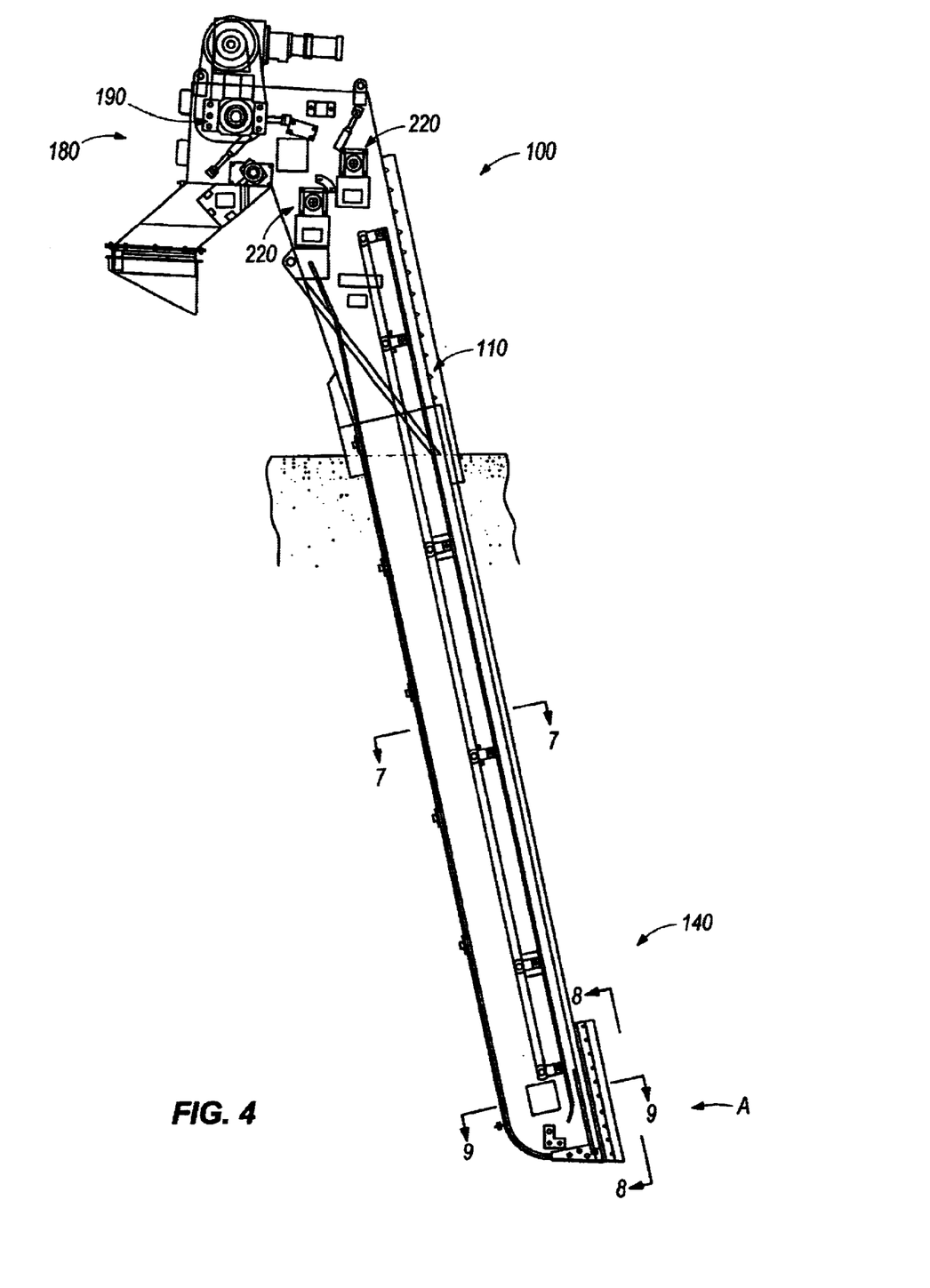
FIG. 4 is a side elevational view of a waste water filter assembly in accordance with the present invention with the filter screen cleaning grid omitted.
Figure 5:
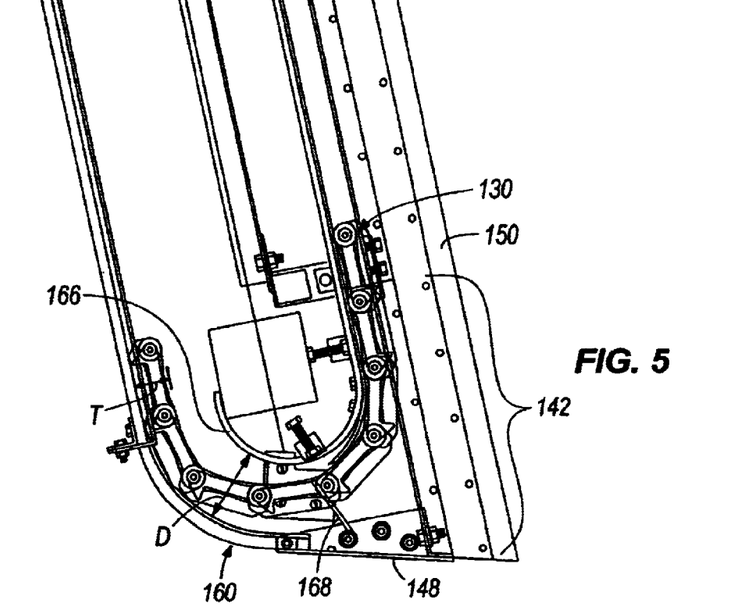
FIGS. 5 and 6 are partial elevational views of the filter assembly in accordance with the present invention with the filter screen properly tensioned (FIG. 5) and in need of tensioning (FIG. 6)
Figure 6:
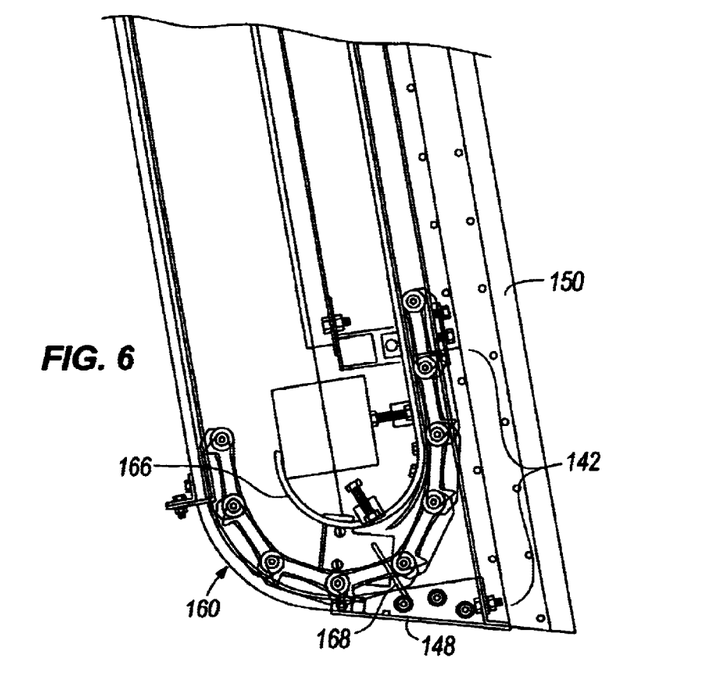
Figure 7:
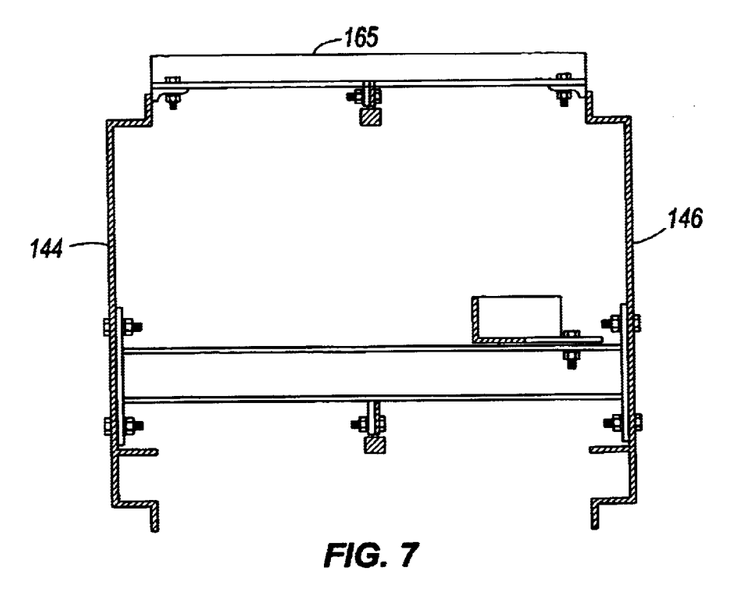
FIG. 7 is a sectional view taken along the line 7—7 in FIG. 4.
Figure 8:
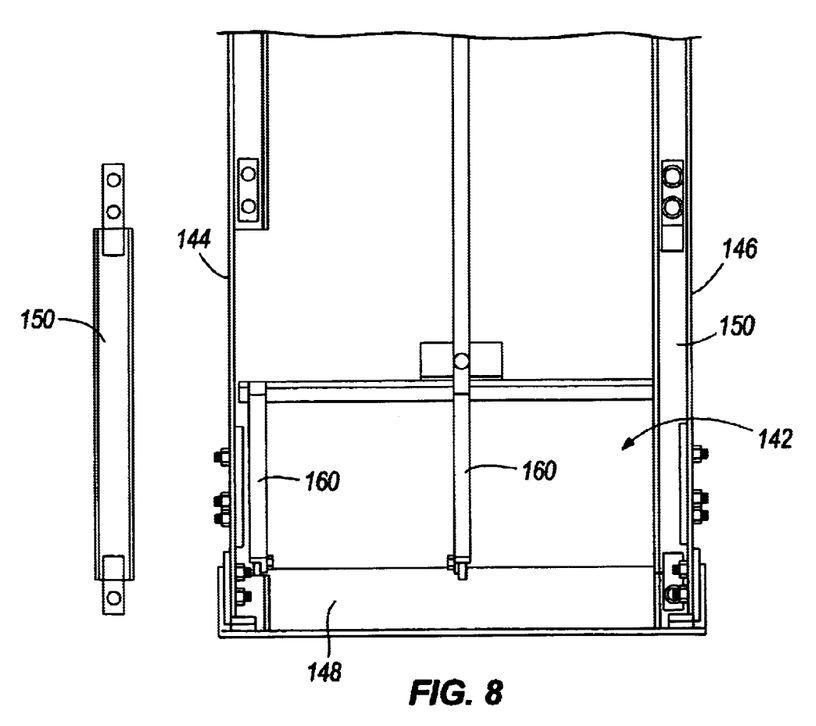
FIG. 8 is a front elevational view taken along the line 8—8 in FIG. 4 with one of the side plates removed.

The preferred waste water filter screen assembly 100 of the present invention is shown in FIGS. 4–18. Referring to FIGS. 4 and 5, the filter screen assembly 100 generally includes a frame assembly 110 in which a fine filter rotating grid 130 (see FIG. 5) travels. The rotating grid 130 may be a link type grid or a panel type grid. The rotating grid 130 is driven by a drive assembly 190 adjacent the filter screen assembly head 180. Idler roller assemblies 220 are provided to guide the rotating grid 130 through the filter screen assembly head 180. Water travels in the direction of the arrow A in FIG. 4 and passes through the rotating grid 130 in the foot section 140 of the filter screen assembly 100.

The preferred embodiment of the foot section 140 is shown in FIGS. 4–11. The foot section 140 includes an open area 142 through which the water travels. The open area 142 is defined by thin side walls 144 and 146 and a bottom plate 148. Removable side plates 150 and seal members 152 seal the side walls 144 and 146 to the water channel. However, removal of the side plates 150 and seal members 152 allows easy access to the internal components. The rotating grid 130 travels between spaced apart inner and outer guide members. In the preferred embodiment, the guide members are defined by outer guide rails 160 and an inner semi-circular wear bar 166. The guide rails 160 defining the outer extent of the grid 130 travel path and the inner wear bar 166 defining the inner extent of the grid 130 travel path.

The rotating grid 130 does not ride on the guide rails 160 and the inner wear bar 166. Instead, the guide rails 160 and wear bar 166 only define the extents of the rotating grid path, with the rotating grid 130 preferably hanging substantially freely between the guide rails 160 and bar 166 as shown in FIG. 5. The rotating grid 130 has a thickness T and the guide rails 160 and bar 166 are spaced a distance D that is substantially greater than the thickness T. The distance D is preferably approximately twice the thickness T. As such, in operation the grid 130 is generally not in contact with the guide rails 160, as shown in FIG. 5. In the event the rotating grid 130 sags, stretches or is otherwise misaligned, see FIG. 6, the grid 130 is be supported by the guide rails 160 until the grid 130 is repositioned to the desired operating position. The filter screen assembly 100 preferably includes an adjustment mechanism 154 that allows the grid 130 to be lifted to the desired operating position. As can be seen from the figures, the foot section 140 is free of side guide rails that define a specific travel track for the rotating grid 130.

Figure 9:
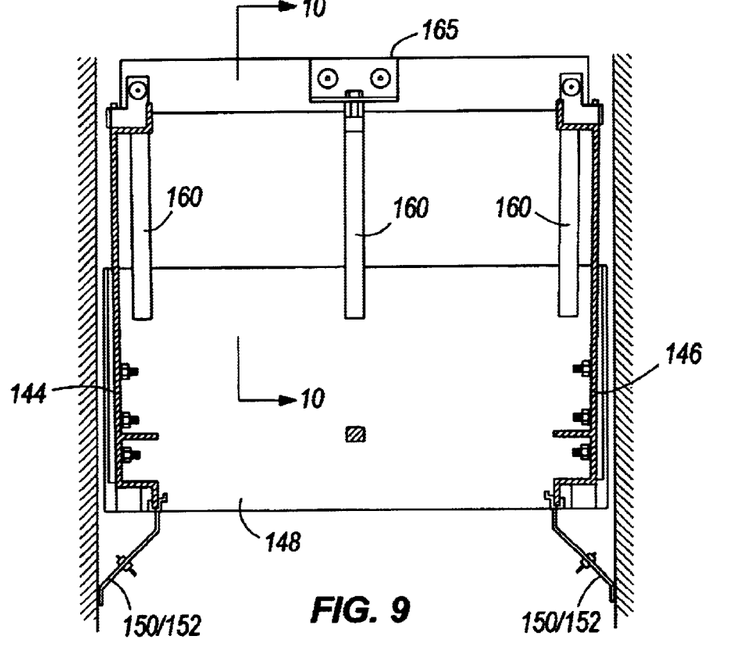
FIG. 9 is a sectional view taken along the line 9—9 in FIG. 4.
Figure 10:
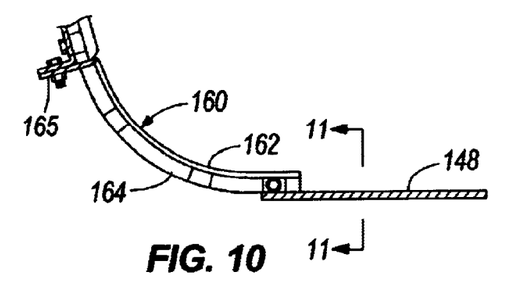
FIG. 10 is a sectional view taken along the line 10—10 in FIG. 9.
Figure 11:
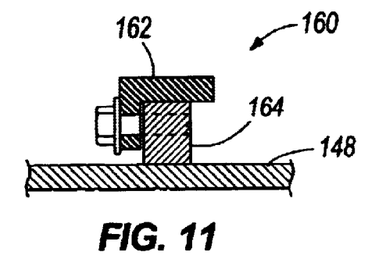
FIG. 11 is a sectional view taken along the line 11—11 in FIG. 10.

Referring to FIGS. 9–11, the guide rails 160 are preferably positioned at spaced apart locations that are to align with guide portions of the rotating grid 130. Each guide rail 160 includes an arcuate planar surface 162 supported on a support member 164 extending between the bottom plate 148 and a rear support bar 165. The planar surfaces 162 are preferably manufactured from stainless steel and are removable to allow easy maintenance and replacement. Water and grit are free to pass through the open area 142 and do not get caught between the grid 130 and the guide rails 160. The relatively small cross-sectional area and the spacing of the guide rails 160 allows grit and smaller debris to easily travel past the rails 160 without any build-up. An adjustable dual influent brush 168 is positioned along the bottom plate 148 to prevent larger debris from passing past the grid 130. Larger debris contacts the brush 168 and is directed upward where it is picked up and removed by the grid 130. The brush 168 is right within the open area 142 so it is easily accessible, cleanable and replaceable.

Figure 12:
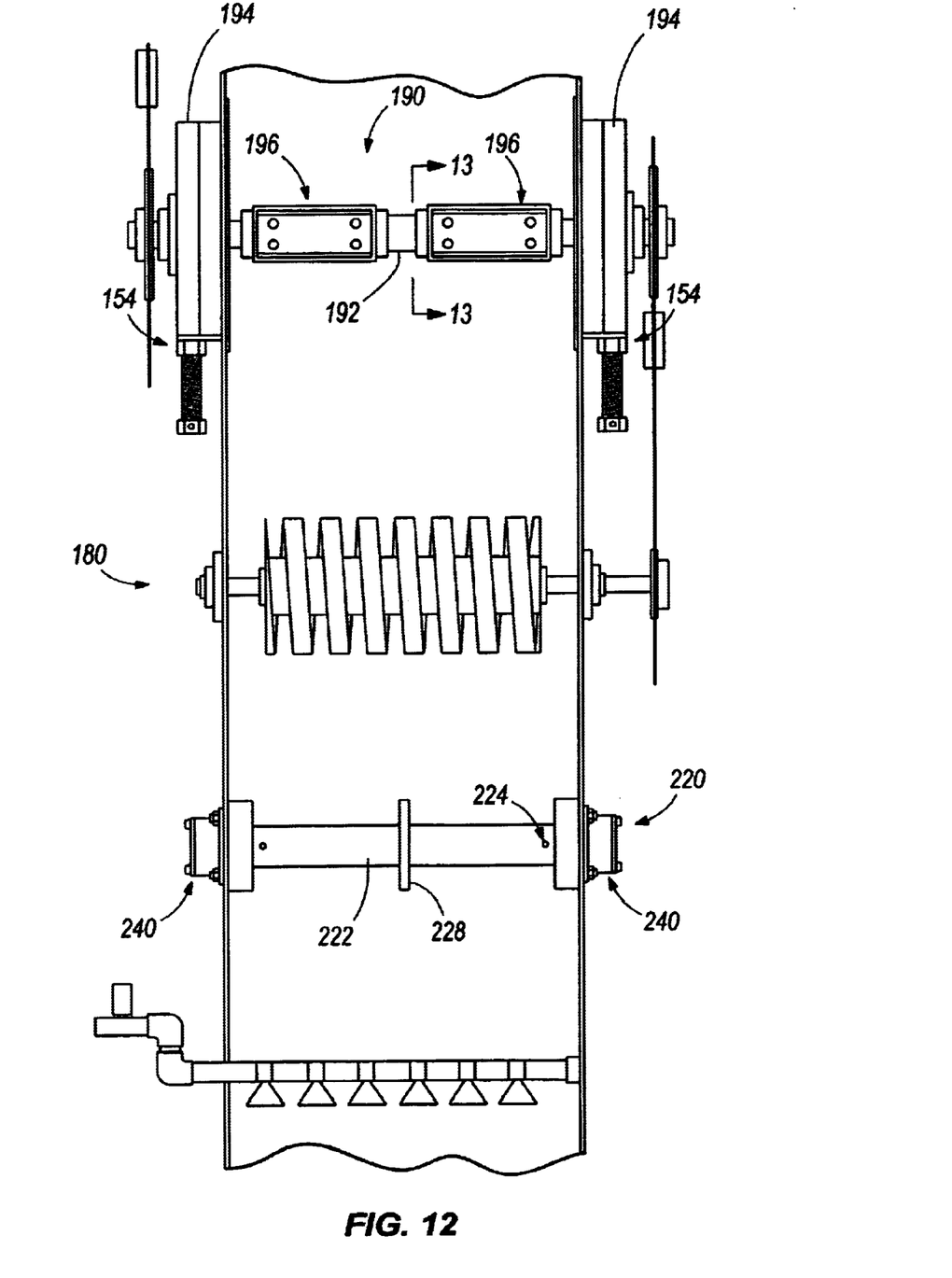
FIG. 12 is a partial schematic illustration of the preferred head section of the filter assembly in accordance with the present invention.
Figures 13, 14:
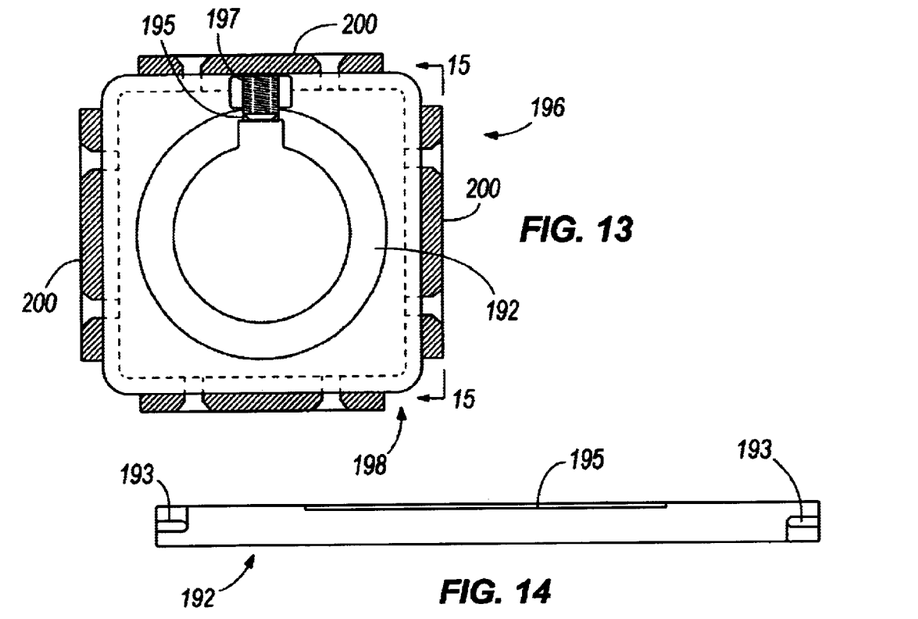
FIG. 13 is a sectional view taken along the line 13—13 in FIG. 12.
FIG. 14 is a side elevational view of the preferred drive shaft.
Figure 15:
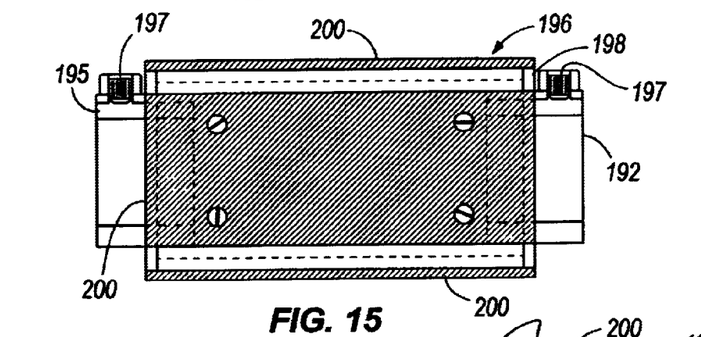
FIG. 15 is a front elevational view taken along the line 15—15 in FIG. 13.
Figure 16:
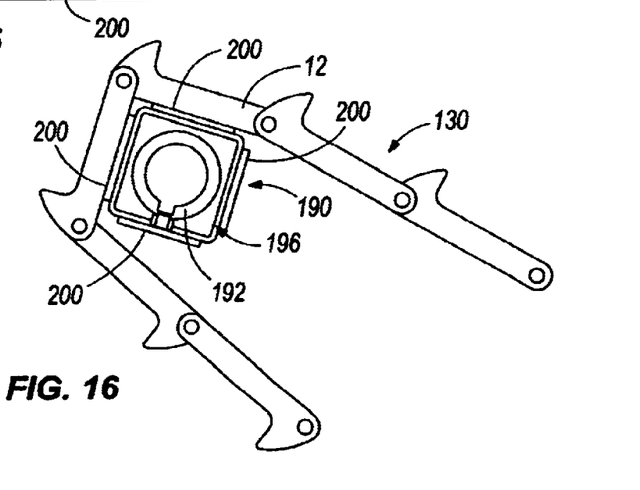
FIG. 16 is a schematic illustration of the filter screen rotating grid positioned about the preferred drive drum assembly of the present invention.

The preferred drive shaft assembly 190 of the present invention is shown in FIGS. 12–16. The drive shaft assembly 190 includes a drive shaft 192 driven by a motor (not shown) or the like. The shaft 192 is mounted in an external bearing assembly 194 that allows for easy removal of the drive shaft 192. As seen in FIG. 14, the shaft 192 preferably has end key slots 193 for engaging the shaft 192 with the bearing assembly 194 and a center key slot 195. A plurality of drive drums 196 are mounted on the shaft 192. Each drum 196 has a square frame 198 mounted on the drive shaft 192, via set screws 197 received in the center key slot 195, for rotation therewith. Each side of the frame 198 is provided with a high friction material pad 200, for example, high friction brake pad lining. The drums pads 200 preferably have a contact length approximately equal to the distance between adjacent screen guide links (not shown) such that the high friction pad 200 contacts almost all of the filter elements 12 in that grid section. The weight of the rotating grid 130 allows the friction between the drum pads 200 and the filter elements 12 to drive the rotating grid 130. Any misalignment between the filter elements 12 is absorbed by the friction pads 200 such that proper grid 130 driving is maintained even if the filter elements 12 are misaligned.

Figure 17:
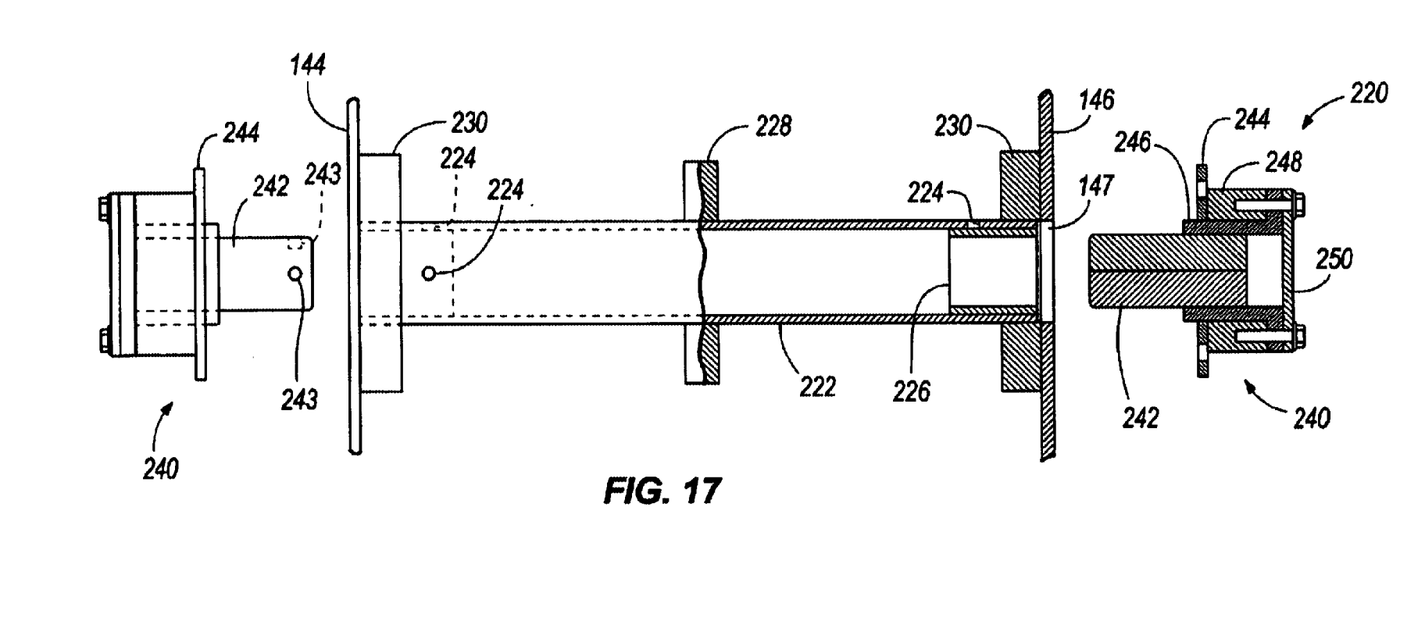
FIG. 17 is a side elevational view, with half of the assembly in section, of a preferred idler roller assembly of the present invention.

Referring to FIGS. 12 and 17, a preferred embodiment of the idler roller assembly 220 is shown. The idler roller assembly 220 comprises a shaft 222 mounted between a pair of roller support members 240. The illustrated shaft 222 has a center roller 228 and a pair of end rollers 230. Each roller wheel 228, 230 aligns with and contacts a respective guide link (not shown) on the rotating grid 130. The number and positioning of the rollers 228, 230 can be adjusted to meet the requirements of a given filter screen assembly 100. Each roller 228, 230 is a solid cylinder with a center hole for positioning on the shaft 222. The rollers 228, 230 may be press fit, keyed, welded or otherwise secured to the shaft 222. The rollers 228, 230 are preferably sized such that the outer rollers 230 are slightly larger to maintain proper tracking of the rotating grid 130, but may have various configurations.

The shaft 222 is a hollow tube with a smooth surface roll sleeve 230 press fit in each end thereof. Set holes 224 extend through the shaft 222 and sleeves 226 at each end of the shaft 222. The roll sleeves 226 are configured to receive and rotate with a support shaft 242 extending from each support member 240. Each support shaft 242 has set bores 243 configured to align with the set holes 224 such that set screws (not shown) journal the shaft 222 to the support shafts 242. Each support shaft 242 extends through a hole 147 in a respective side wall 144, 146 of the filter screen assembly 100. The support shaft 242 is received in a bushing 246 that allows smooth rotation of the support shaft 242. The bushing 246 is preferably manufactured from a synthetic material, for example, Acetron GP. The bushing 246 is supported in a sleeve 248 secured between a mounting plate 244 and an end cap 250. The shaft 222 can easily be removed for maintenance or replacement by simply releasing the set screws and removing the support assemblies 240 which are external and easily removed.

Figure 18:
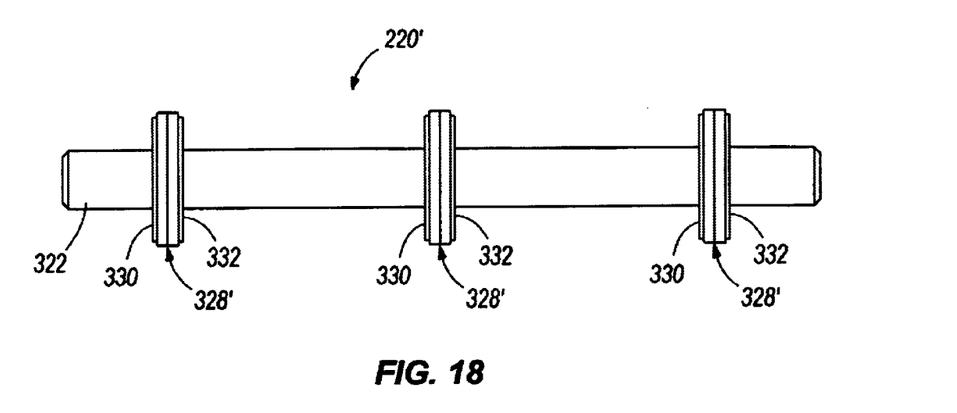
FIG. 18 is a front elevational view of a preferred idler roller assembly of the present invention.
Figure 19:
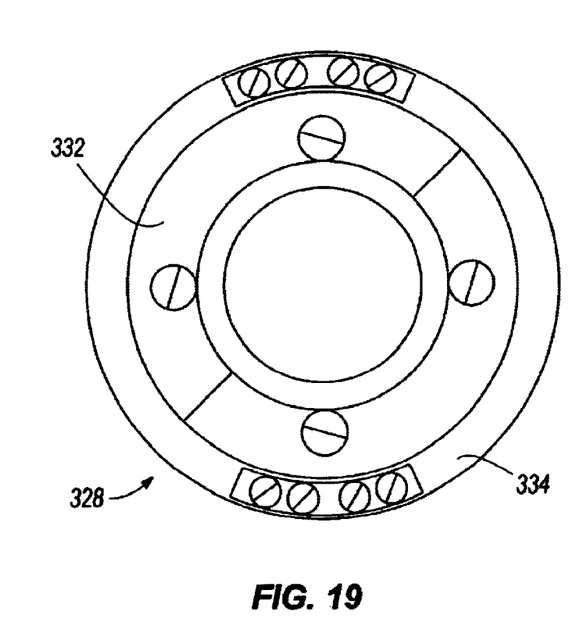
FIG. 19 is a side elevational view of a preferred idler roller of the present invention.
Figure 20:
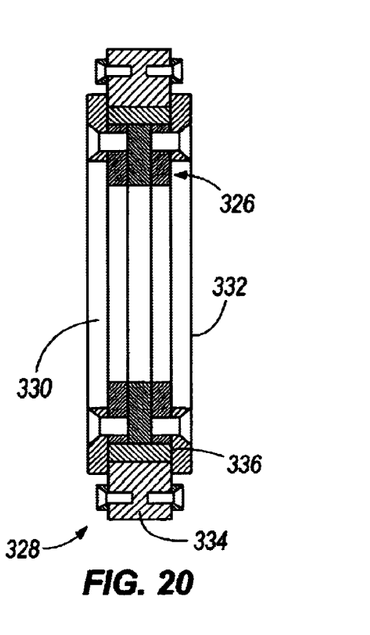
FIG. 20 is a front elevational view of the idler roller wheel of FIG. 19.

An alternate embodiment of the idler roller assembly 220' is shown in FIGS. 18–20. The roller assembly 220' includes a shaft 322 mounted in external roller bearings 324 that allow rotating of the shaft 322 if necessary and for easy removal of the idler roller assembly 220'. A plurality of roller supports 326 are mounted on the shaft 322 for support of roller wheels 328. Each roller wheel 328 preferably includes a replaceable split steel roller wheel 334 with an internal non-metallic bushing 336. Each roller wheel 328 aligns with and contacts a respective guide link (not shown) on the rotating grid 130. The roller wheels 328 are preferably secured between opposed plates 330, 332 to create a confined path for the roller wheel 328 and to add rigidity. The roller wheels 328 are preferably sized such that the outer roller wheels 328' are slightly larger to maintain proper tracking of the rotating grid 130. The idler nature of the independent roller wheels 328 of the roller assembly 220 significantly reduces the frictional load on the rotating grid 130 and allows each guide link grid path to act independently of one another regardless of accumulated tolerances throughout the grid.

What is claimed is:

1. A fine filter screen assembly comprising:

a frame assembly including a foot section adapted to be positioned in a water channel;

a fine filter grid supported in the frame assembly for rotation through the foot section, the fine filter grid having a thickness T; and inner and outer guide members supported in the foot section to define given extents of a grid travel path through the foot section, the inner and outer guide members spaced from one another at least a distance D that is substantially larger than the thickness T such that the fine filter grid is free handing between the inner and outer guides and at least a portion of the filter grid traveling through the foot section is in noncontact relation to the inner and outer guides.

2. The fine filter screen assembly of claim 1 wherein the distance D is at least twice the thickness T.

3. The fine filter screen assembly of claim 1 wherein the inner guide member includes a semi-circular wear bar.

4. The fine filter screen assembly of claim 1 wherein the outer guide member includes at least one arcuate guide rail.

5. The fine filter screen assembly of claim 4 wherein the arcuate guide rail includes an arcuate planar surface.

6. The fine filter screen assembly of claim 4 wherein the outer guide member includes at least two spaced apart guide rails.

7. The fine filter screen assembly of claim 6 wherein the fine filter grid includes a plurality of spaced apart guide links and the outer guide member includes a guide rail aligned with each guide link.

8. The fine filter screen assembly of claim 1 wherein the frame assembly includes a base plate defining the bottom extent of the fine filter screen assembly, the fine filter grid is maintained spaced from the bottom plate and a brush member extends between the base plate and the fine filter grid.

9. The fine filter screen assembly of claim 1 further comprising an adjustment mechanism configured to adjust the position of the fine filter grid within the grid travel path.

* * * * *